United States Patent
Kodama

(10) Patent No.: US 6,657,342 B2
(45) Date of Patent: Dec. 2, 2003

(54) SPINDLE MOTOR HAVING DYNAMIC PRESSURE BEARING

(75) Inventor: Mitsuo Kodama, Fujieda (JP)

(73) Assignee: Victor Company of Japan Ltd., Kanagawa-ken (JP)

( * ) Notice: Subject to any disclaimer, the term of this patent is extended or adjusted under 35 U.S.C. 154(b) by 0 days.

(21) Appl. No.: 10/096,098

(22) Filed: Mar. 13, 2002

(65) Prior Publication Data

US 2002/0130571 A1 Sep. 19, 2002

(30) Foreign Application Priority Data

Mar. 13, 2001 (JP) ........................................ 2001-070013

(51) Int. Cl.[7] .............................................. H02K 71/08
(52) U.S. Cl. ........................................ 310/90; 310/67 R
(58) Field of Search ................................ 310/90, 67 R; 384/112, 113; 360/98.07, 99.08

(56) References Cited

U.S. PATENT DOCUMENTS 6,059,459 A * 5/2000 Ichiyama .................... 384/112

FOREIGN PATENT DOCUMENTS

| JP | 1150023 | 6/1989 |
|----|---------|--------|
| JP | 2001-078388 | 3/2001 |
| JP | 2001-099143 | 4/2001 |

* cited by examiner

Primary Examiner—Thanh Lam
(74) Attorney, Agent, or Firm—Connolly Bove Lodge & Hutz LLP

(57) ABSTRACT

A spindle motor preferable for hard disk drive (HDD) is composed of a radial dynamic pressure bearing portion constructed by a periphery of a shaft and a sleeve and a thrust dynamic pressure bearing portion constructed by a thrust plate fixed with the sleeve and the shaft. The dynamic pressure bearing portion is filled with a lubricating oil to help stable rotation of the shaft with a rotor. The spindle motor includes a shaft for having a first taper surface with a taper angle $\theta 1$ towards the direction of rotational axis thereof, and a sleeve for having a second taper surface with a taper angle $\theta 2$ towards the direction of rotational axis thereof, on the position opposed to the first taper surface. The taper angle $\theta 1$ is greater than the taper angle $\theta 2$.

1 Claim, 2 Drawing Sheets

SPINDLE MOTOR HAVING DYNAMIC PRESSURE BEARING

BACKGROUND OF THE INVENTION

1. Field of Invention

The present invention relates to a spindle motor having dynamic pressure bearing for hard disk drive (HDD) which stably retains lubricant in a bearing portion.

2. Description of Related Art

FIG. 4 shows a cross-sectional view of a conventional spindle motor for hard disk drive (HDD). In FIG. 4, a spindle motor 300 is composed of a motor base 1, a shaft 2, dynamic pressure grooves 3 and 4, a hub 5, a cylindrical sleeve 6, a thrust plate 7, a flange 8, a plurality of cores 9, a coil 10, a ring magnet 11, a yoke 12, a rotor 13, and a stator 14. θ3 is an angle of a taper portion.

The stator 14 of the spindle motor 300 for HDD is composed of the motor base 1, the core 9 and the coil 10. The rotor 13 is rotatably placed in a position opposed to the stator 14, and is composed of the shaft 2, the hub 5, the ring magnet 11 and the yoke 12. The shaft 2 for the rotor 13 is rotatably positioned in the cylindrical sleeve 6 fixed at the center of the motor base 1.

The motor base 1 described above is made of aluminum or aluminum alloy. The plurality of cores 9 wound up with the coil 10 is fixed circularly around the sleeve 6. The shaft 2 is made of a stainless steel system material. The hub 5 for the rotor 13 has the ring magnet 11 and the yoke 12 placed in a position opposed to the core 9 for the stator 14. In addition, the peripheral portion of the hub 5 has a structure for connecting a hard disk (hereinafter referred to as HD; not shown) for recording data information.

The shaft 2 and the sleeve 6 compose a radial dynamic pressure bearing portion to bring dynamic pressure towards the radial direction in the cylindrical sleeve 6.

The dynamic pressure grooves 3 and 4 are formed inside of the cylindrical sleeve 6 contiguously opposed to the peripheral surface of the shaft 2 being inserted rotatably in the inside of the cylindrical sleeve 6. The dynamic pressure grooves 3 and 4 have herringbone shaped grooves formed in sideways.

The peripheral surface of the shaft 2 has a first shaft portion contiguously opposed to the dynamic pressure groove 3 and 4, and a second shaft portion sandwiched by two of the first shaft portion. The diameter of the first shaft portion is usually bigger than that of the second shaft portion.

In the cylindrical sleeve 6, lubricating oil having predetermined viscosity is filled in between the space inside surface of the sleeve 6 and the peripheral surface of the shaft 2. The lubricating oil flows in the space between the dynamic pressure grooves 3 and 4, and between two of the first shaft portions respectively. The lubricating oil to be filled in the radial dynamic pressure bearing portion and in the thrust dynamic pressure bearing portion (as explained below) also flows in each space of the dynamic pressure bearing.

In the radial dynamic pressure bearing portion described above, the dynamic pressure towards the radial direction occurs by the dynamic pressure grooves 3 and 4 of the cylindrical sleeve 6 and the lubricating oil when the shaft 2 rotates. The dynamic pressure towards the radial direction is putting a pressure force equally on the peripheral surface of the shaft 2.

The pressure force towards the periphery of the shaft 2 provides stable rotation of the shaft 2 in the cylindrical sleeve 6. It is obvious that the dynamic pressure grooves 3 and 4 can be formed circularly on the peripheral surface of the shaft 2 to make dynamic pressure towards the radial direction.

The thrust dynamic pressure bearing portion is composed of the flange 8 fixed at the bottom of the shaft 2, and the thrust plate 7 covering the bottom portion of the cylindrical sleeve 6.

The plane surface of the flange 8 is formed with herringbone shaped dynamic pressure grooves not shown. The flange 8 is a disciform shape and has a hole in the center thereof, and is made of copper system material. The bottom portion of the shaft 2 fits with the hole in the flange 8 and is bonded to become one piece with the flange 8.

The bottom portion of the inner surface of the cylindrical sleeve 6 has two step-shaped differences in concentric circle of which center crosses the rotational axis. The deeper difference fits with the flange 8, which becomes one piece with the shaft 2. Then the thrust plate 7 fits with the shallower difference to cover the inner bottom portion of the cylindrical sleeve 6.

Consequently, the shaft 2 is rotatably supported in the cylindrical sleeve 6 with the flange 8 and thrust plate 7. Before covering the bottom portion of the cylindrical sleeve 6, the lubricating oil is filled in the space between the shaft 2 and the flange 8 and the thrust plate 7, inside the cylindrical sleeve 6.

As a result, the bottom portion of the shaft 2 contacts with the thrust plate 7 when the shaft 2 is not rotating, and moves from the thrust plate 7 when the shaft 2 is rotating.

As to the thrust dynamic pressure bearing portion, the dynamic pressure towards the thrust direction occurs by the inner surface of the cylindrical sleeve 6 contiguously opposed to the flange 8, and two dynamic pressure grooves formed on the flange 8, and the thrust plate 7 and the lubricating oil when the shaft 2 rotates.

The dynamic pressure towards the thrust direction is putting a pressure force equally on the plane surface of the flange 8, which becomes one piece with the shaft 2. More specifically, the dynamic pressure balances a downward force to push down the rotor 13 by the dynamic pressure groove formed on the upper plane surface of the flange 8 and an upward force to push up the rotor 13 by the dynamic pressure groove formed on the lower plane surface of the flange 8. The balance of the upward and downward force rotatably holds the rotor 13 supported by the shaft 2 (the lubricating oil will stay in the space between the shaft 2 and the thrust plate 7 when the shaft 2 is rotating).

As described above, the lubricating oil having predetermined viscosity is filled in each dynamic pressure bearing portion to bring dynamic pressure towards the radial direction in the radial dynamic pressure bearing portion and towards the thrust direction in the thrust dynamic pressure bearing portion respectively for the spindle motor 300 for HDD.

The lubricating oil stays in each dynamic pressure bearing portion when the shaft 2 is not rotating. However, when the shaft 2 rotates, the lubricating oil moves to the open space in the upper portion of the inside of the cylindrical sleeve 6. A sealing described below is provided to the open space in the cylindrical sleeve 6 to prevent the lubricating oil from leaking out from the inside of the cylindrical sleeve 6, but it will be complicated and costly.

If the lubricating oil leaks out from inside of the cylindrical sleeve 6, it may stick on the surface of the HD mounted on the hub 5 of the rotor 13 to interfere recording and/or reproducing operation for the HD. Further, if the lubricating oil leaks out from the cylindrical sleeve 6, each dynamic pressure bearing portion runs out of the lubricating oil, and the dynamic pressure for radial direction and thrust direction can not be obtained properly. As a result, the rotor 13 can not rotate at the predetermined revolution, which would deteriorate the function of the spindle motor 300 for HDD.

Accordingly, the lubricating oil should be sealed properly. For example of sealing, a downward taper portion (having a taper angle θ3) is provided at the upper portion of the inside of the sleeve 6 as shown in FIG. 4. A magnetic fluid not shown can also be used for sealing. Further, a labyrinth structure can be provided between the upper portion of the cylindrical sleeve 6 and the inner circumference of the rotor 13 to seal the lubricating oil. However, the sealing described above are too complicated and costly for the spindle motor 300.

SUMMARY OF THE INVENTION

Accordingly, in consideration of the above-mentioned problems of the related art, an object of the present invention is to provide a spindle motor having a radial dynamic pressure bearing portion and a thrust dynamic pressure bearing portion, the spindle motor including a shaft (2A, 2B) having a first taper surface (2Ad) on the periphery thereof for supporting a rotor for rotation relative to a stator, wherein the first taper portion has a taper angle θ1 towards the upward direction of a rotational axis, a cylindrical sleeve (6A, 6B) for rotatably supporting the shaft and having a second taper portion (6Ad) opposed to the first taper portion via lubricating oil so as to form the radial dynamic pressure bearing portion, wherein the second taper portion has a taper angle θ2 towards the downward direction of the rotational axis, wherein the first taper angle θ1 is bigger than the second taper angle θ2 (θ1>θ2), and a thrust plate (7A, 7B) for rotatably supporting the shaft and for fixing the cylindrical sleeve with the stator so as to form the thrust dynamic pressure bearing portion.

Other object and further features of the present invention will be apparent from the following detailed description when lead-in conjunction with the accompanying drawings.

DETAILED DESCRIPTION OF THE PREFERRED EMBODIMENTS

[First embodiment]

Figure 1:
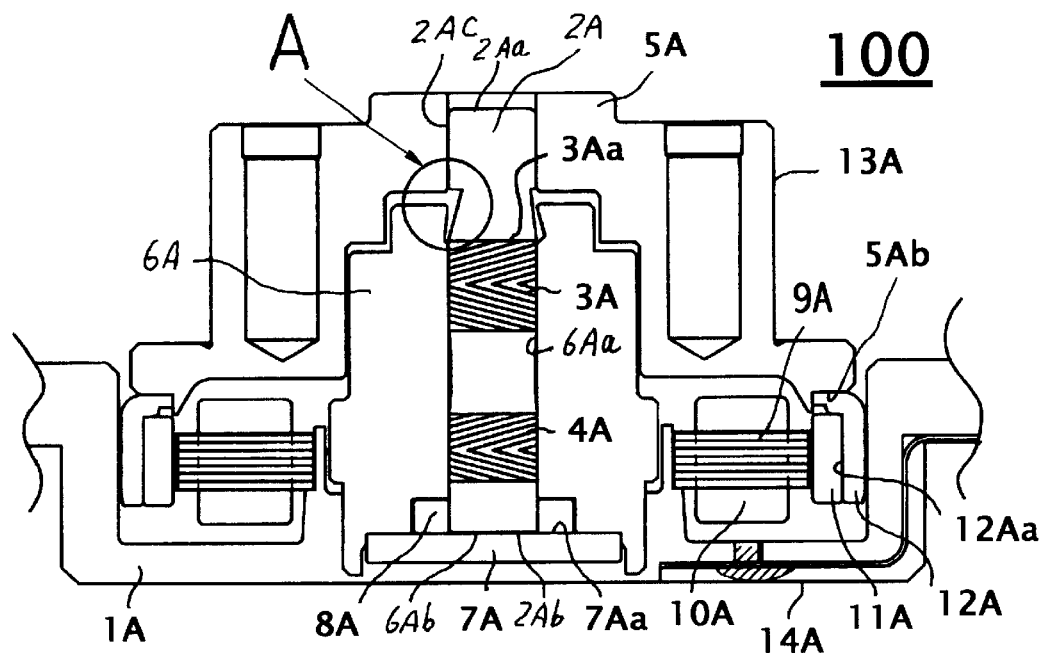
FIG. 1 is a cross-sectional view of a spindle motor according to a first embodiment of the present invention.

FIG. 1 shows a cross-sectional view of a spindle motor in accordance with a first embodiment of the present invention. In FIG. 1, a spindle motor 100 is composed of a motor base 1A, a shaft 2A, an upper edge 2Aa of the shaft 2A, a downward edge 2Ab of the shaft 2A, a peripheral surface 2Ac of the shaft 2A, dynamic pressure groove portions 3A and 4A, an upper portion 3Aa of the dynamic pressure groove portion 3A, a hub 5A for holding the shaft 2A, a bottom peripheral surface 5Ab of the hub 5A, a sleeve 6A in a cylindrical shape for holding the shaft 2A, a peripheral surface 6Aa of the sleeve 6A, a bottom peripheral surface 6Ab of the sleeve 6A, a thrust plate 7A for holding the shaft 2A at the bottom and for covering the bottom portion of the motor base 1A, an upper side 7Aa of the thrust plate 7A, a flange 8A, a core 9A, a coil 10A, a ring magnet 11A, a ring yoke 12A, a peripheral side 12Aa of the yoke 12A, a rotor 13A, and a stator 14A.

Figure 2:
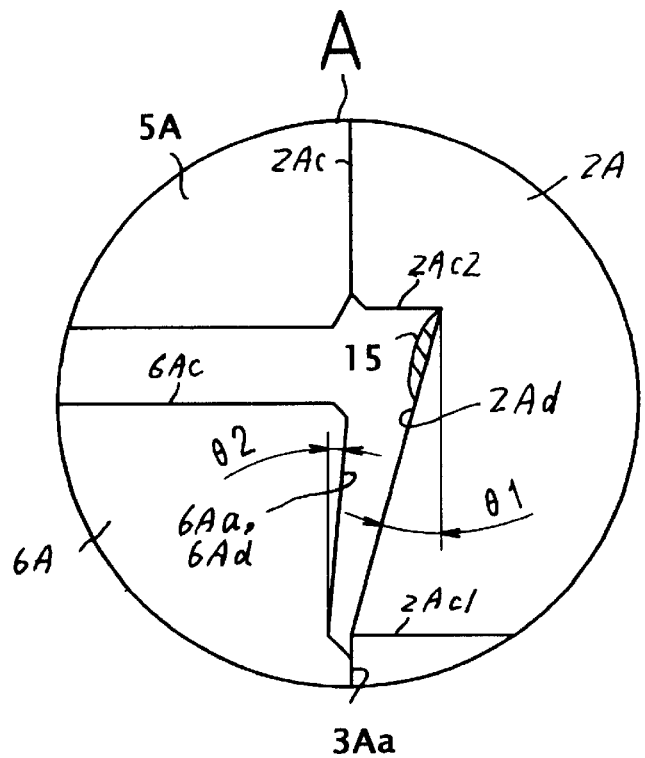
FIG. 2 is an enlarged view of a partial area A shown in FIG. 1.

FIG. 2 shows an enlarged side view of a portion A shown in FIG. 1. In FIG. 2, the portion A includes an upper peripheral surface 6Ac of the sleeve 6A, the shaft 2A, and the inner side of the hub 5A, which is composed of a first taper portion 2Ad, a second taper portion 6Ad, a first peripheral surface 2Ac1 of the shaft 2A, a second peripheral surface 2Ac2 of the shaft 2A, and a peripheral surface 2Ac of the shaft 2A, an area 15 for putting an oil repelling substance. The first taper portion 2Ad has a first taper angle of θ1 upwardly with the rotational direction of the motor 100 (which direction is parallel to the rotational axis of the shaft 2A), and the second taper portion 6Ad has a second taper angle of θ2 downwardly with the rotational direction of the motor 100.

The first taper angle of θ1 is bigger than the second taper angle of θ2 (θ1>θ2). In this connection, the first taper portion 2Ad is formed in the peripheral surface 2Ac of the shaft 2A, and the second taper portion 6Ad is formed in the inner surface of the sleeve 6A opposing to the first taper portion 2Ad. The first and the second taper portion 2Ad and 6Ad form a holding portion of the lubricating oil which prevents the oil from leaking out from the inside of the sleeve 6A.

More specifically, the spindle motor 100 for HDD is composed of the hub 5A for mounting HD, the ring yoke 12A formed in the bottom peripheral 5Ab of the hub 5A, the ring magnet 11A fixed with the peripheral side 12Aa of the ring yoke 12A, the rotor 13A having the shaft 2A which edge portion 2Aa is fixed with the center of the rotational axis of the hub 5A, the thrust plate 7A for covering the bottom portion 6Ab fixed with the motor base 1A and forming the dynamic pressure groove portion 3A at the upper peripheral surface 6Ac, the sleeve 6A for holding the shaft 2A rotatablly by the other edge 2Ab, and the plurality of cores 9A placing peripherally around the sleeve 6A stick out towards the radial direction.

As the shaft 2A is held in the inner side of the sleeve 6A, the downward edge 2Ab of the shaft 2A contacts with the upper surface 7Aa of the thrust plate 7A. In this state, the diameter of the shaft 2A decreases from the peripheral surface 2Ac1 towards the peripheral surface 2Ac2 which makes the slope for the first taper portion 2Ad.

The inner peripheral surface 6Aa of the sleeve 6A has the second taper 6Ad which portion is opposing to the first taper surface 2Ad with certain slope angle. The first taper portion 2Ad has the first taper angle θ1 upwardly with the rotational direction of the shaft 2A (the motor) and the second taper portion 6Ad has the second taper angle θ2 downwardly with the rotational direction of the shaft 2A (the motor) respectively. The relation between the first and the second taper angle is θ1>θ2.

The spindle motor 100 has the radial dynamic pressure bearing portion and the thrust dynamic pressure bearing portion. A first dynamic pressure bearing portion is defined as having the flange 8A and the thrust plate 7A, and the thrust dynamic pressure bearing portion described above. A second dynamic pressure bearing portion is defined as having the thrust dynamic pressure bearing portion and the dynamic pressure groove portion 4A.

The spindle motor 100 is usually used horizontally as shown in FIGS. 1 and 2. However, the spindle motor can be used in other settings such as upside-down, or sloping in predetermined angle.

In FIG. 2, the periphery of the shaft 2A has the first taper portion 2Ad with the first taper angle $\theta 1$, and the inner periphery of the sleeve 6A has the second taper portion 6Ad with the second taper angle $\theta 2$, wherein the relation between the first and second taper angles is $\theta 1 > \theta 2$. In the first embodiment, the revolution of the spindle motor 100 is in the range of 5,400 rpm to 15,000 rpm, the first taper angle $\theta 1$ is 5°, and the second taper angle $\theta 2$ is 2° approximately.

The leakage of the lubricating oil can be suppressed when the first taper angle $\theta 1$ is more than or equal to 3°. However, as the first taper angle becomes more than 10°, the diameter of the taper portion of the shaft 2A becomes so thinner that the processing cost becomes expensive and the shaft 2A becomes weaker.

On the other hand, the effectiveness of sealing can be provided when the second taper angle $\theta 2$ is at least 1° but it should be lesser than the first taper angle $\theta 1$. The second taper angle $\theta 2$ is most preferable when it is more than or equal to 1° and less than or equal to 5°.

The peripheral portion of the first taper portion 2Ad contiguous to the second peripheral surface 2Ac2 has the area 15 for applying oil repellent. As the oil repellent is applied to the peripheral portion of the first taper portion 2Ad, the lubricating oil is blocked by the oil repellent when the lubricating oil moves upwardly by rotation of the rotor 2A. Further, the area 15 can block the lubricating oil permeating minute irregularity of the peripheral surface of the shaft by capillary action.

As described above, the present invention can seal the lubricating oil leaking out of the sleeve 6A in the first dynamic pressure groove.

The lubricating oil permeating the peripheral surface of the shaft 2A by capillary action at the rotation of the motor 100 can be sealed by the first taper portion 2Ad and the second taper portion 6Ad formed in the dynamic pressure groove 3A. The oil moves to the bigger rotational diameter portion by centrifugal force when the rotor 13A rotates. The bigger rotational portion in this case is the portion contiguous to the first peripheral portion 2Ac1 and the inner peripheral surface 6Aa, and the oil does not leak to the upper peripheral surface 6Ac.

The lubricating oil is stirred by the dynamic pressure groove 3A and 4A, and pushed back by resistant force of capillary action when it moves between the taper portion 2Ac1 and 6Ad. As the lubricating oil moves upward between the first peripheral portion 2Ac1 and the second taper portion 6Ad to the upper peripheral surface 6Ac, the difference of taper angle ($\theta 1 - \theta 2$) makes the difference of the surface area of the lubricating oil. The intermolecular force (or surface tension) of the lubricating oil affects on the surface to make it smaller. In this sense, the oil can not move upward beyond the certain level.

In connection with the sealing force obtained by the surface tension of the lubricating oil caused by capillary force between the taper portion 4Ac1 and 6Ad is not strong as mechanical sealing force. The sealing force obtained by the surface tension may not suppress the lubricating oil from leaking out when great physical impact or vibration hits the motor.

In this sense, the second taper angle $\theta 2$ is defined to be smaller than the first taper angle $\theta 1$. As the shaft 2A rotates, in FIG. 2, the lubricating oil in the first dynamic pressure portion moves upward and downward. The sealing force, which pulls back the lubricating oil moving upward, is stronger than the force pulling up the oil moving downward.

As the first taper angle $\theta 1$ is greater than the second taper angle $\theta 2$, the resistant force occurred by capillary force of the lubricating oil moving upward is greater than the resistance force occurred by capillary force of the lubricating oil moving downward.

Whichever taper angle (the angle $\theta 1$ or $\theta 2$) is bigger, it makes the surface area of the lubricating oil between the first taper portion 2Ad and the second taper portion 6Ad bigger. Consequently, the lubricating oil tends to move inwardly than to move outwardly in the sleeve 6A.

In addition, as the lubricating oil moves beyond the second taper portion 6Ad, the oil repellent in the area 15 blocks the movement of the lubricating oil, and the lubricating oil stays in the position where the sealing force of the first and the second taper portion 2Ad and 6Ad balances. The area 15 for the oil repellent is formed in the upper portion of the first taper portion 2Ad.

As described above, the structure of the first and the second taper portion 2Ad and 6Ad provides sealing of the lubricating oil in the first dynamic pressure portion. The present invention provides the spindle motor of which the rotor 13A and the shaft 2A are fixed and the shaft 2A and the stator 14A perform as dynamic pressure bearing. However, the present invention is not limited to the structure mentioned above but also include the structure that the shaft 2A is fixed with the stator 14A and performs as dynamic pressure bearing between the shaft 2A and the rotor 13A.

[Second Embodiment]

Figure 3:
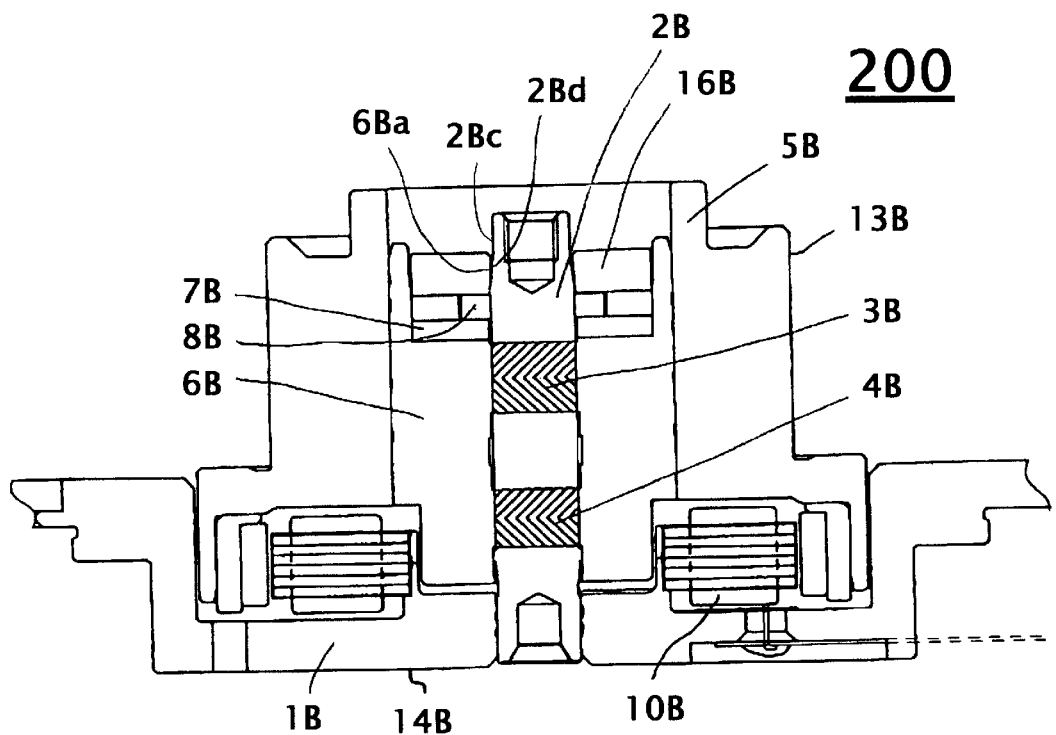
FIG. 3 is a cross-sectional view of a spindle motor according to a second embodiment of the present invention.
Figure 4:
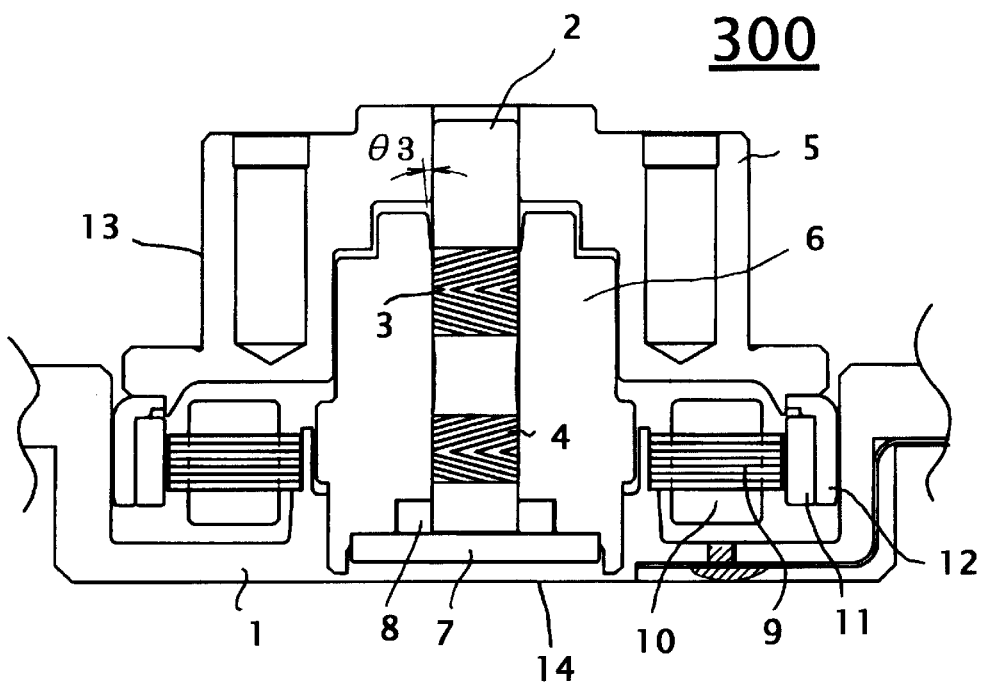
FIG. 4 is a cross-sectional view of the motor apparatus according to the related art.

FIG. 3 is a cross-sectional view of a spindle motor 200 according to a second embodiment of the present invention. The spindle motor 200 is the type of that a shaft is fixed with a stator.

In FIG. 3, a spindle motor 200 is composed of a motor base 1B, a shaft 2B, a first peripheral surface 2Bc of the shaft 2B, a second peripheral surface 2Bd of the shaft 2B, a bushing 16B for covering the rotational portion of the shaft 2B, dynamic pressure groove portions 3B and 4B, a hub 5B, a sleeve 6B in a cylindrical shape for rotatably supporting the shaft 2B, a third peripheral surface 6Ba of the sleeve 6B, a thrust plate 7B, a flange 8B, a coil 10B, a rotor 13B, and a stator 14B. Lubricating oil is filled in between the inner peripheral of the sleeve 6B and the peripheral surface of the shaft 2B.

The shaft 2B and the first peripheral surface 2Bc and the third peripheral surface 6Ba perform as radial dynamic pressure bearing. The upper side of the thrust plate 7B, the upper and bottom sides of the flange 8B, and the bushing 16B perform as thrust dynamic pressure bearing. The third peripheral surface 6Ba and the first peripheral surface 2Bc also perform as a first taper surface and a second taper surface respectively. In this sense, the lubricating oil filled in between the shaft 2B and the sleeve 6B will not leak out therefrom. Other functions and constitution of the spindle motor 200 are identical to those of the spindle motor 100 of the first embodiment. Therefore, details of those areas are omitted.

According to an aspect of the present invention, there provided a spindle motor, which has a first taper portion in the sleeve and a second taper portion in the shaft respectively, so that the lubricating oil filled in between the shaft and the sleeve in a cylindrical shape is suppressed from leaking out therefrom by the dynamic pressure towards the radial and thrust directions caused by rotation of the motor.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

What is claimed is:

1. A spindle motor having a radial dynamic pressure bearing portion and a thrust dynamic pressure bearing portion, the spindle motor comprising:

a shaft having a first taper surface on the periphery thereof for supporting a rotor for rotation relative to a stator, wherein the first taper portion has a taper angle $\theta 1$ towards the upward direction of a rotational axis;

a cylindrical sleeve for rotatably supporting the shaft and having a second taper portion opposed to the first taper portion via lubricating oil so as to form the radial dynamic pressure bearing portion, wherein the second taper portion has a taper angle $\theta 2$ towards the downward direction of the rotational axis, wherein the first taper angle $\theta 1$ is bigger than the second taper angle $\theta 2$ ($\theta 1 > \theta 2$); and a thrust plate for rotatably supporting the shaft and for fixing the cylindrical sleeve with the stator so as to form the thrust dynamic pressure bearing portion.

* * * * *

UNITED STATES PATENT AND TRADEMARK OFFICE
CERTIFICATE OF CORRECTION

PATENT NO. : 6,657,342 B2
DATED : December 2, 2003
INVENTOR(S) : Mitsuo Kodama

It is certified that error appears in the above-identified patent and that said Letters Patent is hereby corrected as shown below:

Column 7,
Line 10, after "a shaft having a first" delete "taper" and insert -- tapered --.
Line 12, after "wherein the fist" delete "taper" and insert -- tapered --.
Line 13, before "a rotational axis;" delete "towards the upward direction of" and insert -- in relation to --.

Column 8,
Line 2, after "having a second" delete "taper" and insert -- tapered --.
Line 2, after "opposed to the first" delete "taper" and insert -- tapered --.
Line 3, before "so as to form" delete "via lubricating oil" and insert -- , --.
Line 4, after "dynamic pressure bearing portion," insert -- lubricating oil being held in a holding portion formed by the first and second tapered portions. --.
Line 5, before "portion" delete "taper" and insert -- tapered --.
Lines 5-6, after "portion has a taper angle [theta] 2" delete "towards the downward direction of the rotational axis" and insert -- in relation to the rotational axis --.

Signed and Sealed this

Twenty-fourth Day of May, 2005

JON W. DUDAS
*Director of the United States Patent and Trademark Office*